(12) United States Patent
Pendleton et al.

(10) Patent No.: US 6,361,604 B2
(45) Date of Patent: *Mar. 26, 2002

(54) APPARATUS FOR ADDING OIL OR OTHER LIQUIDS TO A DRY BULK POWDER

(75) Inventors: Gregory B Pendleton, Montevallo, AL (US); Fred R. Huege, Colleyville, TX (US)

(73) Assignee: Chemical Lime Company, Ft. Worth, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/309,751

(22) Filed: May 11, 1999

(51) Int. Cl.[7] .............................. B05B 17/00; B05D 7/00
(52) U.S. Cl. ........................................ 118/303; 427/212
(58) Field of Search ................................. 427/212, 213, 427/215, 218, 219, 220, 221, 242; 118/303, 302, 17, 313, 317, 13, 24

(56) References Cited

U.S. PATENT DOCUMENTS

| | | | | |
|---|---|---|---|---|
| 2,097,914 A | | 11/1937 | Cooper et al. ................. | 91/44 |
| 2,197,792 A | * | 4/1940 | Erickson ........................ | 91/44 |
| 2,563,475 A | * | 8/1951 | Mahoney ....................... | 91/44 |
| 3,707,136 A | * | 12/1972 | Kostas ....................... | 118/303 |
| 4,439,211 A | * | 3/1984 | Anderson et al. ................. | 55/1 |
| 4,478,171 A | * | 10/1984 | Bridges et al. ............. | 427/242 |
| 4,478,896 A | | 10/1984 | Barnes et al. ................ | 427/421 |
| 4,686,115 A | | 8/1987 | Majer ........................... | 427/212 |
| 4,689,249 A | | 8/1987 | Thygesen .................... | 427/180 |
| 4,794,022 A | * | 12/1988 | Johnson et al. ............. | 427/212 |
| 4,921,674 A | * | 5/1990 | Enos ........................... | 118/303 |

* cited by examiner

Primary Examiner—Richard Crispino
Assistant Examiner—Yewebdar T Tadesse
(74) Attorney, Agent, or Firm—Bracewell & Patterson, LLP

(57) ABSTRACT

The present invention is directed towards a method of preventing fine particles, especially liming material, from becoming air borne, and the addition of desirable chemical compounds to the particles. The method comprises feeding fine particles of solid to an enclosed inclined chute and locating at least a first inclined shelf and a subsequent inclined shelf within the chute, each shelf having an inclined top surface, a bottom surface and a leading edge. At least one liquid fog nozzle is located between the bottom surface of the first shelf and the chute, the fog nozzle creating a fog of liquid in the direction of the leading edge of the first shelf. Once the particles fall from the shelf, a fog is applied to the particles as the vertical free flow of particles falls from the leading edge of the first shelf. The inclined positioning of the chute allows gravity to pull the once coated particles to at least a second inclined shelf. After passing over at least the second shelf, the liquid coated particles are discharged through a discharge funnel, the liquid coating preventing fine particles from becoming air borne.

12 Claims, 2 Drawing Sheets

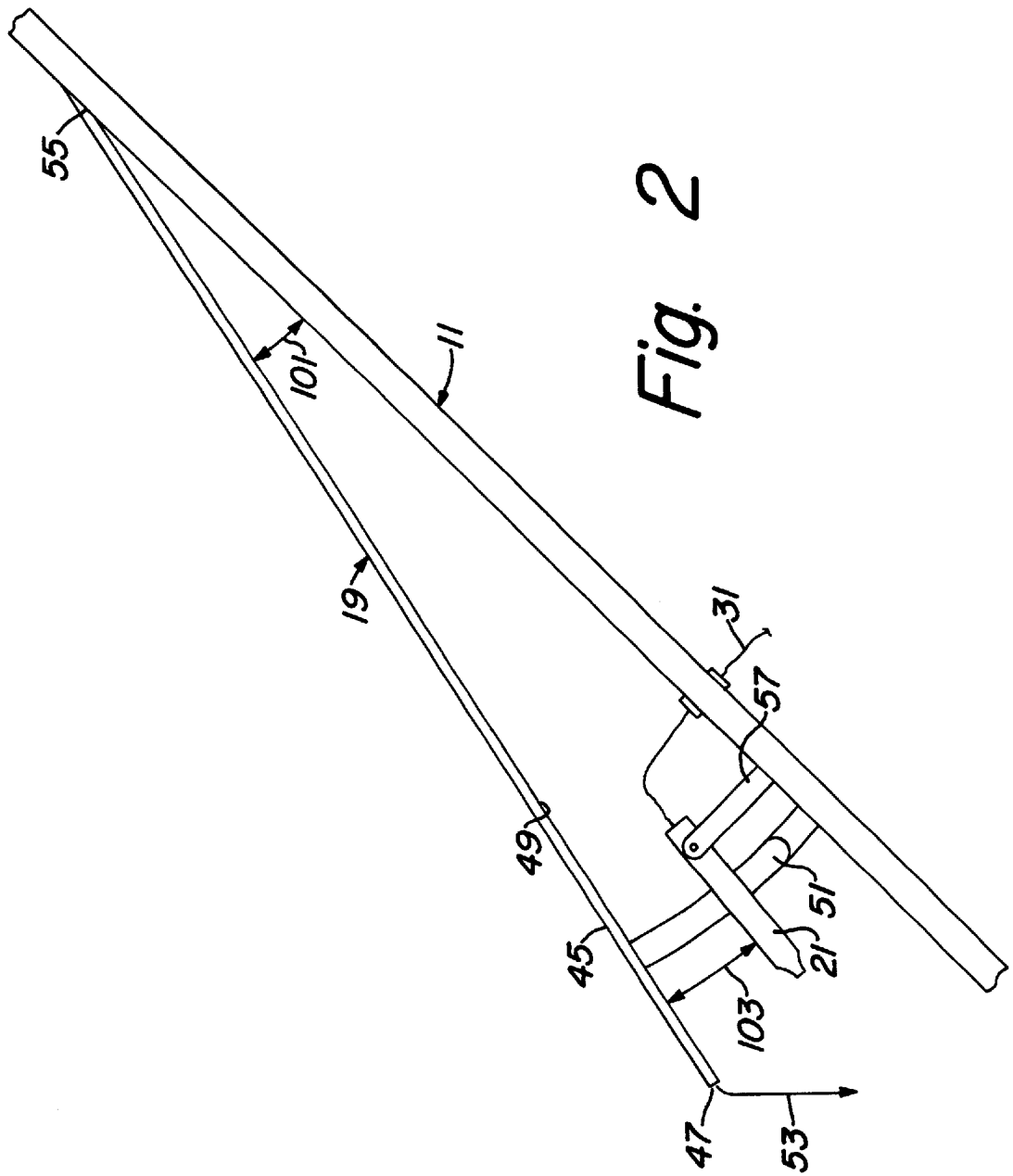

APPARATUS FOR ADDING OIL OR OTHER LIQUIDS TO A DRY BULK POWDER

BACKGROUND OF THE INVENTION

1. Field of the Invention

The present invention relates in general to a device and method of coating particulates with a liquid. In particular, this invention relates to coating fine granular and particulate hydroscopic matter with a fog of oil and other liquids to reduce powdering and/or to add desirable ingredients to the matter.

2. Description of the Prior Art

Often it is desirable to add small amounts of oil or other liquid to the surface of bulk powders, particulates, or granular material. It is almost always desirable to have uniform coating of the liquid material over all of the surface of the solid material. There are many reasons for coating particulate matter with liquid, among them to reduce dusting which creates waste and is an environmental hazard, to reduce agglomeration of particles that are hydroscopic and tend to bind together into large clumps, and to add chemicals to the particles to achieve some desirable end. This invention is directed towards coating fine and very fine particulates, and in particular particulates of liming material that are hydroscopic and tend to form air borne dust.

There are several methods commonly employed to carry out the coating of particulates with liquids. The first is by adding the liquid to the bulk material in a blender or mixer where, through particle-to-particle contact, the small amount of liquid is distributed to all particles. This technique is not very effective in that the solid particles are porous and absorb the liquid into the particles unevenly. Another problem with this technique in particular is that the mixing or blending is a separate process step and will likely increase the amount of fines in the product which may not be desirable.

A second method of liquid coating particles is to spray the particles with a fine stream or mist of the liquid. If the particles are porous, then the solid material can be sprayed with a fine mist of the liquid in a mixer where the surface of the material that is being sprayed is in constant mixing so as to expose more material to the liquid spray. Finally, the liquid can be added to the solid material and then the material is finely ground so as to coat all of the newly formed powder. This technique would only be effective if a fine ground product was required.

There are several devices that have been designed to spray-coat particulate matter such as seed, wood shavings, or coal. Cooper et al. (U.S. Pat. No. 2,097,914) and Enos (U.S. Pat. No. 4,921,674) were designed to coat coal particles and plant seed, respectively. These devices consist of a hopper with spray devices located inside the hopper, the spray devices being located under fixed baffles that deflected the falling material that is then sprayed. The Barnes et al. (U.S. Pat. No. 4,478,896) invention uses a series of conveyers to transport the solid particles and thus requires many moving parts in its operation. Further, the Barnes et al. device does not afford adequate protection of the spray heads from clogging that can occur with very fine particulates, as the Barnes et al. device is directed towards wood shavings. These devices are relatively complex, requiring many moving parts to operate. Also, these devices may not be well suited for very fine particulates such as in liming dust used for agricultural and construction purposes. Lime and quicklime (CaO and $Ca(OH)_2$) are hydroscopic and thus tend to agglomerate as water is absorbed and reacted. Thus, an improved means of liquid coating these materials is necessary.

Coating particles, especially liming materials, with liquids can have both environmental and economic benefits. Loss of material due to dusting, and its escape into the air (thus creating a pollution hazard) can also be reduced. Due to Environmental Protection Agency (EPA) regulations and other economic reasons, it is highly desirable to make the coating of particles more cost efficient and easier to carry out.

What is needed is an apparatus that can deliver a fog of liquid such as oil that will can coat very fine particles such as liming materials. The present invention is directed towards such a use.

SUMMARY OF THE INVENTION

One object of the present invention is to provide an improved means of adding a coat of liquid to fine or very fine particulate matter.

Another object of the invention is to provide a means of applying oil to hydroscopic particulates such as CaO, $Ca(OH)_2$, and other "liming" materials to prevent the particles from becoming air borne.

Another object of the present invention is to provide a means of creating a fog of liquid mixtures, such as oil and water, that are not miscible.

Another object of the present invention is to provide a means of protecting the liquid fog nozzles of the invention from clogging with the particulate matter.

Yet another object of the present invention is to provide a series of shelves that are adjustable and allow particles to flow by force of gravity.

These objects and others are achieved by application of the device and method of the present invention. The present invention is directed towards a method of agglomeration of fine particles and the addition of desirable chemical compounds to the particles. The method comprises feeding fine particles of solid to an enclosed inclined chute and locating at least a first inclined shelf and a subsequent inclined shelf within the chute, each shelf having an inclined top surface, a bottom surface and a leading edge. An addition funnel fitted with air pads may be used at the top of the chute to facilitate the even and continuous addition of particulates to the chute. Once the particles are fed to the top of the chute, they fall on the top surface of the first inclined shelf and slide down the inclined top surface by force of gravity until falling from the leading edge, thus forming a vertical free flow of particles. At least one liquid fog nozzle is located between the bottom surface of the first shelf and the chute, the fog nozzle creating a fog of liquid in the direction of the leading edge of the first shelf. The fog nozzles create homogeneous droplets of the liquid or liquid mixture through the force of the liquid within the nozzle. Once the particles fall from the shelf, a fog of at least one liquid is applied to the particles as the vertical free flow of particles falls from the leading edge of the first shelf. The inclined positioning of the chute allows gravity to pull the once coated particles to at least a second inclined shelf. After passing over at least the second shelf, the liquid coated particles are discharged through a discharge funnel, the liquid coating preventing excess dusting of the fine particles.

The number of shelves can be varied within the chute. Further, the inclination of the chute relative to the ground and the shelves relative to the chute can be varied. The fog spray nozzles can be independently adjusted, and there can be more than one fog sprayer under each chute for fogging more than one type of liquid on the particles. The chute can also have a discharge funnel for discharging the coated particles into a truck, train car, or other storage or transport means. The discharge funnel can also have a dust collector to recycle uncoated dust particles.

Additional objects, features and advantages will be apparent in the written description which follows.

BRIEF DESCRIPTION OF THE DRAWINGS

FIG. 2 is a closeup of a shelf and fog nozzle of FIG. 1.

BRIEF DESCRIPTION OF THE INVENTION

Figure 1:
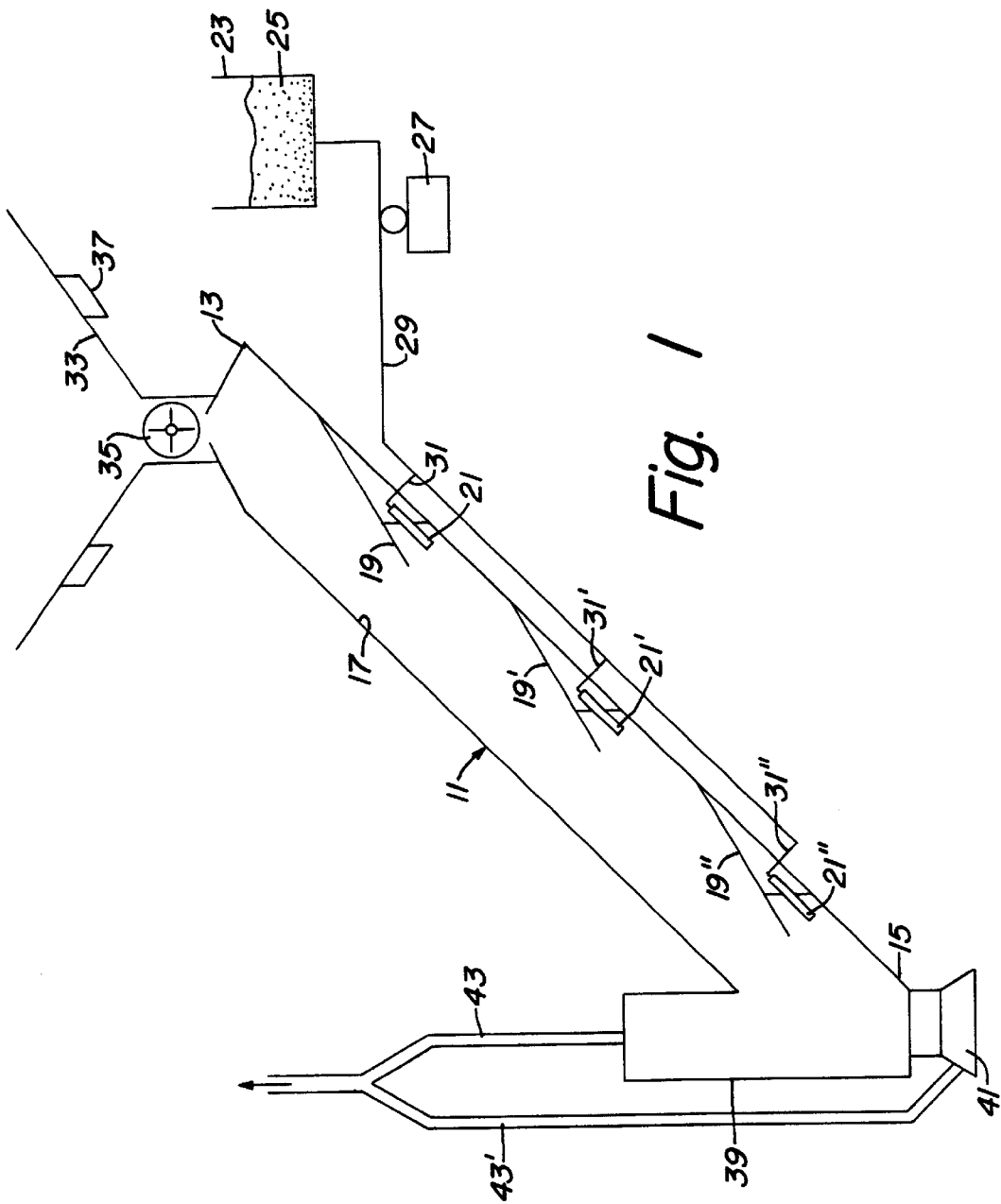
FIG. 1 is a schematic, cutaway side view of the apparatus of the invention.

The invention will be described with reference to FIG. 1 and FIG. 2, which show one embodiment of the present invention. The chute 11 is shown inclined relative to the horizon. The inclination can vary depending upon the desired application, and can even be vertical. The chute has a top 13 and a bottom 15. The chute also has an inside surface 17 that creates an enclosure for the particles as they fall generally down the chute from the top 13 to the bottom 15 by force of gravity.

Located within the chute are at least two inclined shelves. Although FIG. 1 shows three shelves 19, 19', and 19", the number may vary. The inclination 101 of the shelves (shown in FIG. 2) relative to the inside surface 17 of the chute can be varied independently. Each shelf has an inclined top surface 45, a bottom surface 49, and a leading edge 47. There is at least one liquid fog nozzle 21 located between the inside surface 17 of the chute and the bottom surface 49 of at least the first shelf 19. More fog nozzles 21' and 21" can be located beneath other shelves. The shelves will be described in greater detail below with reference to FIG. 2.

At least one additive tank 23 with liquid additive 25 within is provided. A metering pump 27 is provided to deliver liquid from the tank 23 to the nozzles 21 through liquid primary line 29, and to each individual nozzle through lines 31, 31', and 31" coming from the primary line 29. The pump and lines are designed to provide pressure to the liquid flowing to the fog nozzles. There can be more than one additive tank for supplying different liquids to the at least one fog nozzle. For example, one liquid may be an additive that enhances a chemical property of the particles, while another liquid may be the anti-dusting agent such as a water/mineral oil mix.

Addition funnel 33 is used to funnel the solid particulate matter into the top 13 of the chute. An adjustable speed feeder 35 is provided to the funnel to apply an even flow of particulate matter into the top of the chute, the air pads 37 coupled to the funnel to facilitate the flow of particulates into the chute.

Referring again to FIG. 1, coupled to the bottom 15 of the chute 11 is discharge chamber 39 and the discharge funnel 41. The chamber 39 is coupled to dust particle recycler tubes 43 and 43' that collects and recirculates uncoated or incompletely coated particles.

There are at least two shelves 19, and 19' located within the chute 11. Referring specifically to FIG. 2, each shelf has a top surface 45, a bottom surface 49, and a leading edge 47. As particulate material falls from the top 13 of the chute through the funnel 33, the material falls onto the top surface 45 and slides down the shelf by force of gravity until it falls off the leading edge 47, forming a vertical free flow of particles as indicated by arrow 53.

The shelf can be adjusted using the adjustable slide bar 51. The angle of inclination 101 can be adjusted relative to the inside surface 17 of the chute. This is accomplished by manually adjusting the shelf level, the point at 55 being fixed but hinged. The slide bar 51 can be disengaged while adjusting, and then engaged to hold the shelf at the desired angle.

The liquid fog nozzle 21 is independently attached to the inside surface 17 of the chute through clip 57. All of the fog nozzles can be attached in this manner, FIG. 2 showing only one clip and nozzle attached thereto. The angle 103 can be adjusted as well as the side-to-side position of the nozzle. The nozzle is such that it will deliver a fog of liquid to the falling flow of particles as indicated by arrow 53. The nozzles are positioned so that the falling dust particles will not contact the nozzle, thus clogging the nozzle. There can be more than one fog nozzle located beneath each shelf for delivering two or more different liquids, the fog nozzles capable of being coupled to different additive tanks as discussed supra.

The method of liquid coating fine particles is now described, with reference to FIGS. 1 and 2. Particles are coated by the apparatus by first feeding particulate matter to the enclosed chute at the top 13 of the chute 11. The funnel 33 and feeder 35 facilitate the steady, continuous flow of material and can be controlled to adjust the amount of material flowing into the chute. The particles fall on the top surface at least a first shelf under which an at least one fog nozzle is located. The shelf serves to lift the particles from the inside surface of the chute, thus forming a vertical free flow of particles off the leading edge 47 of the first shelf as indicated by arrow 53. As the particles fall, they are coated with a homogeneous and evenly dispersed fog of at least one liquid generated from the at least one fog nozzle underneath the shelf, the at least one nozzle being protected from contacting the particles thus not clogging.

Many different liquids 25 can be used to coat the particles. Water based solutions and oils can be used in the present invention. For instance, the apparatus can be used to fog a light mineral oil 0.5 to 5% by volume on the surface of 18 mesh quicklime for the purpose of reducing the airborne dust of the treated material. Also, a liquid solution of soil micronutrients could also be applied in order to add desirable plant nutrients or impart other favorable chemical or physical properties to lime or other material.

The ability to break up the mixture of water and oil into a homogenous fog without mechanical mixers is achieved using the fog nozzles of the invention. The use of mechanical mixing increases the complexity and cost of liquid coating particles such as liming materials, and is thus disadvantageous. The fog nozzles of the present invention break up the water/oil mixture by the physical force of the pressure applied to the mix within the fog nozzle, thus forcing the two phase mixture of oil and water into a homogenous suspension of fine droplets. The pressure metering pump is the primary source of this pressure, the lines and fog nozzles designed to accommodate the pressure. Fogging from the underside of each shelf within the closed chute allows for the vapor laden air volume to expand into the material flow from the leading edge of each shelf and thereby increase the volume and exposure to the surface area of the fine particles to absorb the oil. This expansion and oil dispersion prevents the material from agglomerating into large balls, while at the same time forming smaller liquid coated particles from the fine particulates.

After falling from the first shelf, the particles then fall onto the top surface of at least a second or subsequent shelf as shown in FIG. 1, under which another fog nozzle 21' may be provided. The particles moving by force of gravity over the shelf will fall off the leading edge and the once liquid fogged particles will be coated at least a second time. After being fogged, the particles can fall on either an at least one other shelf, for example 21" in FIG. 1, that may have an associated fog nozzle, or fall into the discharge chamber 39. The apparatus of the present invention can have any number of shelves and fog nozzles, for example three of each as is shown in FIG. 1. It is to be understood that more than one fog nozzle can be placed under each shelf, or none may be placed under some of the shelves. Finally, once in the discharge chamber, the at least once liquid coated particles are funneled out of the apparatus through the discharge funnel 41.

The coating of the particles is important for many reasons, government EPA regulations among them. Until national attention to the matter and the creation of the EPA, dust control in lime plants was practiced by only a minority of plants. Still, most present methods of treating lime dust is an economic hardship and not practical. Most plants that operated dust collection systems were located in large urban areas or near small communities that developed an early intolerance to dust and demanded positive action. The present invention allows lime producers to better treat the dust generated. Further, lime can be more economically transported at less of an ecological price.

The present invention offers several advantages over the prior art of coating particles and small materials such as wood shavings, etc. The present invention works well with fine (2–5 mm diameter) and very fine (less than 1 mm diameter) particulates.

The present invention makes the transport and use of particulates more practical (easier to handle), economical (less loss due to dusting) and more ecological (less dusting). The present invention is adaptable to many forms and embodiments given the adjustability of the chute, the shelves, and the fog nozzles. Both the number and position of the shelves and fog nozzles can be varied to afford complete coating of the particulates. Further, any particulates that are left uncoated can be recycled and placed in the cycle of liquid coating again.

The present invention also provides an improved means of mixing the oil and water mixtures used to coat particles by using physical force from pressure in the nozzles, thus avoiding mechanical stirring which is less efficient and more costly.

While the invention has been shown in only one of its forms, it is not thus limited but is susceptible to various changes and modifications without departing from the spirit thereof.

What is claimed is:

1. An apparatus for delivering free flowing oil coated lime particles having a particle size less than about 5 mm, the apparatus comprising:

an enclosed chute having a top, bottom, and inside surface the top of the chute having a feeder device for feeding fine particles of solid to the chute, and the bottom being fitted with a dust collector to recycle uncoated lime particles;

at least two shelves located within the chute having a top surface, a bottom surface, and a leading edge, the shelves lifting particles as they fall through the chute thus forming a vertical free flow of particles as the particles flow past the shelves by force of gravity;

at least one fog nozzle located between the bottom surface of each shelf and the inside surface of the chute for coating the particles with oil as they fall in a vertical free flow of particles from each shelf the at least one nozzle being selectively sized to create a fog of the oil in the direction of the leading edge of the shelf towards the vertical free flow of falling particles, the fog being created by liquid pressure within the fog nozzle, thus creating a physical force that breaks up the oil into small, homogeneous droplets of liquid, and wherein each fog nozzle is independently attached to the inside surface of the chute by means of an adjustment clip which allows adjustment of both the angular orientation and side-to-side position of the nozzle; and wherein the shelves are mounted within the chute by means of an adjustable slide bar, whereby the inclination of the shelves is adjustable relative to the inside surface of the chute.

2. The apparatus of claim 1, wherein the inclination of the shelves are adjustable relative to the inside surface of the chute.

3. The apparatus of claim 1, wherein the number of shelves in the chute can be varied.

4. The apparatus of claim 1, further providing a discharge funnel attached to the bottom of the chute.

5. The apparatus of claim 1, further providing a dust collector for collecting uncoated dust.

6. The apparatus of claim 1, wherein a pressure metering pump is coupled to the fog nozzles to regulate the liquid flow to the nozzles.

7. The apparatus of claim 6, wherein at least one additive tank is coupled to the metering pump in order to act as a reservoir of liquid for coating the particles.

8. The apparatus of claim 1, further providing an addition funnel coupled to the top of the chute.

9. The apparatus of claim 8, wherein air pads are attached to the addition funnel to facilitate the flow of particles down the funnel.

10. The apparatus of claim 1, wherein more than one liquid is fogged onto the particles, the liquids reacting as they coat the vertical free flow of particles from each shelf.

11. The apparatus of claim 1, wherein the liquid is a mixture of water and oil, the oil being present in the range from 0.5% to 5% by volume.

12. The apparatus of claim 6, wherein the metering pump creates pressure inside the fog nozzles, thus forcing the at least one liquid into a homogeneous fog.

* * * * *